US008595628B2

(12) United States Patent
Bayari et al.

(10) Patent No.: US 8,595,628 B2
(45) Date of Patent: Nov. 26, 2013

(54) METHOD AND SYSTEM FOR REVIEWING TEXT FILES USING DISTRIBUTABLE REVIEW DATA PACKETS

(75) Inventors: Gururaj S. Bayari, Bangalore (IN); Purushothama Shenoy, Bangalore (IN); Prasanna Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1653 days.

(21) Appl. No.: 11/289,339

(22) Filed: Nov. 29, 2005

(65) Prior Publication Data

US 2007/0168959 A1    Jul. 19, 2007

(51) Int. Cl.
*G06F 3/00* (2006.01)
*G06F 9/44* (2006.01)

(52) U.S. Cl.
USPC .......................................... 715/751; 717/123

(58) Field of Classification Search
None
See application file for complete search history.

(56) References Cited

U.S. PATENT DOCUMENTS

| | | | | |
|---|---|---|---|---|
| 4,912,637 | A * | 3/1990 | Sheedy et al. | 707/999.203 |
| 5,706,452 | A * | 1/1998 | Ivanov | 715/751 |
| 5,945,998 | A * | 8/1999 | Eick | 715/973 |
| 6,243,722 | B1 | 6/2001 | Day et al. | |
| 6,275,223 | B1 * | 8/2001 | Hughes | 715/751 |
| 6,698,013 | B1 * | 2/2004 | Bertero et al. | 717/127 |
| 6,796,486 | B2 * | 9/2004 | Ohashi | 715/234 |
| 7,095,854 | B1 * | 8/2006 | Ginter et al. | 380/233 |
| 7,194,679 | B1 * | 3/2007 | Green | 715/233 |
| 7,386,793 | B2 * | 6/2008 | Koike et al. | 715/230 |
| 7,818,678 | B2 * | 10/2010 | Massand | 715/751 |
| 7,865,816 | B2 * | 1/2011 | Tanaka | 715/230 |
| 7,966,556 | B1 * | 6/2011 | Bourdev | 715/230 |
| 2004/0085354 | A1 * | 5/2004 | Massand | 345/751 |
| 2004/0237041 | A1 * | 11/2004 | Koike et al. | 715/526 |
| 2004/0243453 | A1 | 12/2004 | Call et al. | |
| 2005/0198202 | A1 * | 9/2005 | Yamamoto | 715/501.1 |
| 2007/0101256 | A1 * | 5/2007 | Simonyi | 715/511 |

FOREIGN PATENT DOCUMENTS

GB    2 374 956 A    10/2002

OTHER PUBLICATIONS

Weigang, Jim. "APL-ASCII Workspace Transfer." Jun. 1997. ACM SIGAPL APL Quote Quad vol. 27, Issue 4. pp. 3-7. Retrieved from http://portal.acm.org/ft_gateway.cfm?id=291424&type=pdf&coll=GUIDE&dl=GUIDE&CFID=51100046&CFTOKEN=38825728 on Sep. 2, 2009.*

Microsoft Corporation. "Microsoft® Computer Dictionary, Fifth Edition". "ASCII file". May 1, 2002. Retrieved from Safari Bookshelf on Sep. 3, 2009.*

(Continued)

*Primary Examiner* — Don Wong
*Assistant Examiner* — Erika Kretzmer
(74) *Attorney, Agent, or Firm* — Schmeiser, Olsen & Watts;; John Pivnichny

(57) ABSTRACT

A text file is generated by a plurality of users. Comments associated with portions of the text file are inputted utilizing offline computing units. A first and a second location of first and second portions of the text file are automatically obtained. A first review data packet (RDP), and a second RDP are automatically generated. The first and second RDPs consist of one or more comment fields, one or more separators, and one or more effort fields. The comment field consists of comment, author, date, line number, severity, priority, open status, and category. The first and second RDPs are distributed, without the text file, to a third computing unit which utilizes the first and second RDPs to display, respectively, the first comment together with the first portion, and the second comment together with the second portion.

23 Claims, 10 Drawing Sheets

(56) References Cited

OTHER PUBLICATIONS van Meegen, Marco. "Checkclipse Plugin" Jun. 10, 2005. Retrieved from archive.org at the URL web.archive.org/web/20050610004924/http://www.mvmsoft.de/content/plugins/checkclipse/checkclipse.htm on Jan. 11, 2012.*

Abstract of Weigang, J.; APL-ASCII Workspace Transfer; Jun. 1997; APL Quote Quad; vol. 27; No. 4; pp. 3-7. Abstract published by Institution of Electrical Engineers 2004.

Abstract of Text Review with For Comment: Commenting and Editing; Nov. 1998; Personal Computer; No. 11; p. 77. Abstract published by Institution of Electrical Engineers 2004.

* cited by examiner

| Line Num | Comment | Severity | Category | Origin | Status | Comment | Comment Date |
|---|---|---|---|---|---|---|---|
| 16 | Missing a Javadoc comment | MINOR | CHECK STYLE | CODING | OPEN | gbayari | Wed Jan 26 16:40:00 IST 2005 |
| 17 | Missing a Javadoc comment | MINOR | CHECK STYLE | CODING | OPEN | gbayari | Wed Jan 26 16:40:00 IST 2005 |
| 27 | Don's date instead use Calendar | FATAL | ERROR | ProjectPlaning | OPEN | gbayari | Wed Jan 26 16:41:33 IST 2005 |
| 34 | Method 'getComment' is not designed for ex | MINOR | CHECK STYLE | CODING | OPEN | gbayari | Wed Jan 26 16:40:00 IST 2005 |
| 35 | '=' is not followed by whitespace. | MINOR | CHECK STYLE | CODING | OPEN | gbayari | Wed Jan 26 16:40:00 IST 2005 |
| 45 | 'comment' hides a field | MINOR | CHECK STYLE | CODING | OPEN | gbayari | Wed Jan 26 16:40:00 IST 2005 |
| 53 | Method 'getCategory' is not designed for ext | MINOR | CHECK STYLE | CODING | OPEN | gbayari | Wed Jan 26 16:40:00 IST 2005 |

*FIG. 2D*

METHOD AND SYSTEM FOR REVIEWING TEXT FILES USING DISTRIBUTABLE REVIEW DATA PACKETS

BACKGROUND OF THE INVENTION

1. Technical Field

The present invention relates to a system and method for reviewing text files, and more particularly to a technique for reviewing text files using distributable review data packets.

2. Related Art

Conventional tools for reviewing a text file allow entry and viewing of review comments associated with the text file, but do not provide offline simultaneous provision of review comments by multiple users, and do not allow storage and distribution of review comments separate from the file being reviewed. Thus, there is a need for an improved technique for reviewing text files.

SUMMARY OF THE INVENTION

In first embodiments, the present invention provides a method of reviewing a text file by a plurality of users, said plurality of users including a first user utilizing a first computing unit and a second user utilizing a second computing unit, said method comprising:

inputting offline, by said first user utilizing said first computing unit, a first comment associated with a first portion of said text file;

inputting offline, by said second user utilizing said second computing unit, a second comment associated with a second portion of said text file;

automatically obtaining, by said first computing unit, a first location of said first portion within said text file;

automatically obtaining, by said second computing unit, a second location of said second portion within said text file;

automatically generating, by said first computing unit, a first review data packet (RDP) including said first comment and said first location, said first RDP being a first computer file stored in said first computing unit separately from said text file; and automatically generating, by said second computing unit, a second RDP including said second comment and said second location, said second RDP being a second computer file stored in said second computing unit separately from said text file, wherein said first RDP and said second RDP are capable of being distributed, without said text file, to a third computing unit capable of utilizing offline said first comment and said first location from said first RDP to display said first comment together with said first portion, and utilizing offline said second comment and said second location from said second RDP to display said second comment together with said second portion.

In second embodiments, the present invention provides a system for reviewing a text file by a plurality of users, said plurality of users including a first user utilizing a first computing unit and a second user utilizing a second computing unit, said system comprising:

means for inputting offline, by said first user utilizing said first computing unit, a first comment associated with a first portion of said text file;

means for inputting offline, by said second user utilizing said second computing unit, a second comment associated with a second portion of said text file;

means for automatically obtaining, by said first computing unit, a first location of said first portion within said text file;

means for automatically obtaining, by said second computing unit, a second location of said second portion within said text file;

means for automatically generating, by said first computing unit, a first review data packet (RDP) including said first comment and said first location, said first RDP being a first computer file stored in said first computing unit separately from said text file; and means for automatically generating, by said second computing unit, a second RDP including said second comment and said second location, said second RDP being a second computer file stored in said second computing unit separately from said text file, wherein said first RDP and said second RDP are capable of being distributed, without said text file, to a third computing unit capable of utilizing offline said first comment and said first location from said first RDP to display said first comment together with said first portion, and utilizing offline said second comment and said second location from said second RDP to display said second comment together with said second portion.

In third embodiments, the present invention provides at least one program storage device readable by a machine, tangibly embodying at least one program of instructions executable by the machine to perform a method of reviewing a text file by a plurality of users, said plurality of users including a first user utilizing a first computing unit and a second user utilizing a second computing unit, said method comprising:

inputting offline, by said first user utilizing said first computing unit, a first comment associated with a first portion of said text file;

inputting offline, by said second user utilizing said second computing unit, a second comment associated with a second portion of said text file;

automatically obtaining, by said first computing unit, a first location of said first portion within said text file;

automatically obtaining, by said second computing unit, a second location of said second portion within said text file;

automatically generating, by said first computing unit, a first review data packet (RDP) including said first comment and said first location, said first RDP being a first computer file stored in said first computing unit separately from said text file; and automatically generating, by said second computing unit, a second RDP including said second comment and said second location, said second RDP being a second computer file stored in said second computing unit separately from said text file, wherein said first RDP and said second RDP are capable of being distributed, without said text file, to a third computing unit capable of utilizing offline said first comment and said first location from said first RDP to display said first comment together with said first portion, and utilizing offline said second comment and said second location from said second RDP to display said second comment together with said second portion.

In fourth embodiments, the present invention provides a method for deploying computing infrastructure, comprising integrating computer-readable code into a computing system, wherein the code in combination with the computing system is capable of performing a process of reviewing a text file by a plurality of users, said plurality of users including a first user utilizing a first computing unit and a second user utilizing a second computing unit, said process comprising:

inputting offline, by said first user utilizing said first computing unit, a first comment associated with a first portion of said text file;

inputting offline, by said second user utilizing said second computing unit, a second comment associated with a second portion of said text file;

automatically obtaining, by said first computing unit, a first location of said first portion within said text file;

automatically obtaining, by said second computing unit, a second location of said second portion within said text file;

automatically generating, by said first computing unit, a first review data packet (RDP) including said first comment and said first location, said first RDP being a first computer file stored in said first computing unit separately from said text file; and automatically generating, by said second computing unit, a second RDP including said second comment and said second location, said second RDP being a second computer file stored in said second computing unit separately from said text file, wherein said first RDP and said second RDP are capable of being distributed, without said text file, to a third computing unit capable of utilizing offline said first comment and said first location from said first RDP to display said first comment together with said first portion, and utilizing offline said second comment and said second location from said second RDP to display said second comment together with said second portion.

Advantageously, the present invention provides a review process that allows offline review of a text file by multiple reviewers reviewing the text file simultaneously, which avoids the need for reviewers to be connected to a network during the review. Further, the comments and comment-related data generated during the review can be easily distributed to any user, separate from the text file, without requiring the recipient user to have access to a central data repository, a specific platform, or a specific application. Still further, the review process can be completed without changing the text file itself and without requiring a conversion or regeneration of the text file.

BRIEF DESCRIPTION OF THE DRAWINGS

FIG. 2D depicts details of comment information in a report generated by the system of FIG. 1, in accordance with embodiments of the present invention.

DETAILED DESCRIPTION OF THE INVENTION

The present invention provides a computer-based method and system for reviewing and updating a text file. The review of the text file includes generating and storing review comments that are each associated with an identifiable portion of the text file being reviewed. The review comments are generated and stored by multiple users capable of reviewing the text file simultaneously without a need for a network connection or a centralized database. Review comments generated by each user are stored as a computer file (i.e., a review data packet), which can be distributed to other users separately from the text file. Review comments from multiple reviewers are viewed and updated by a user who has authority to update the text file based on the review comments. Further, the present invention provides a software tool that presents a single, integrated interface that is utilized for both reviewing and updating the text file.

Figure 1:
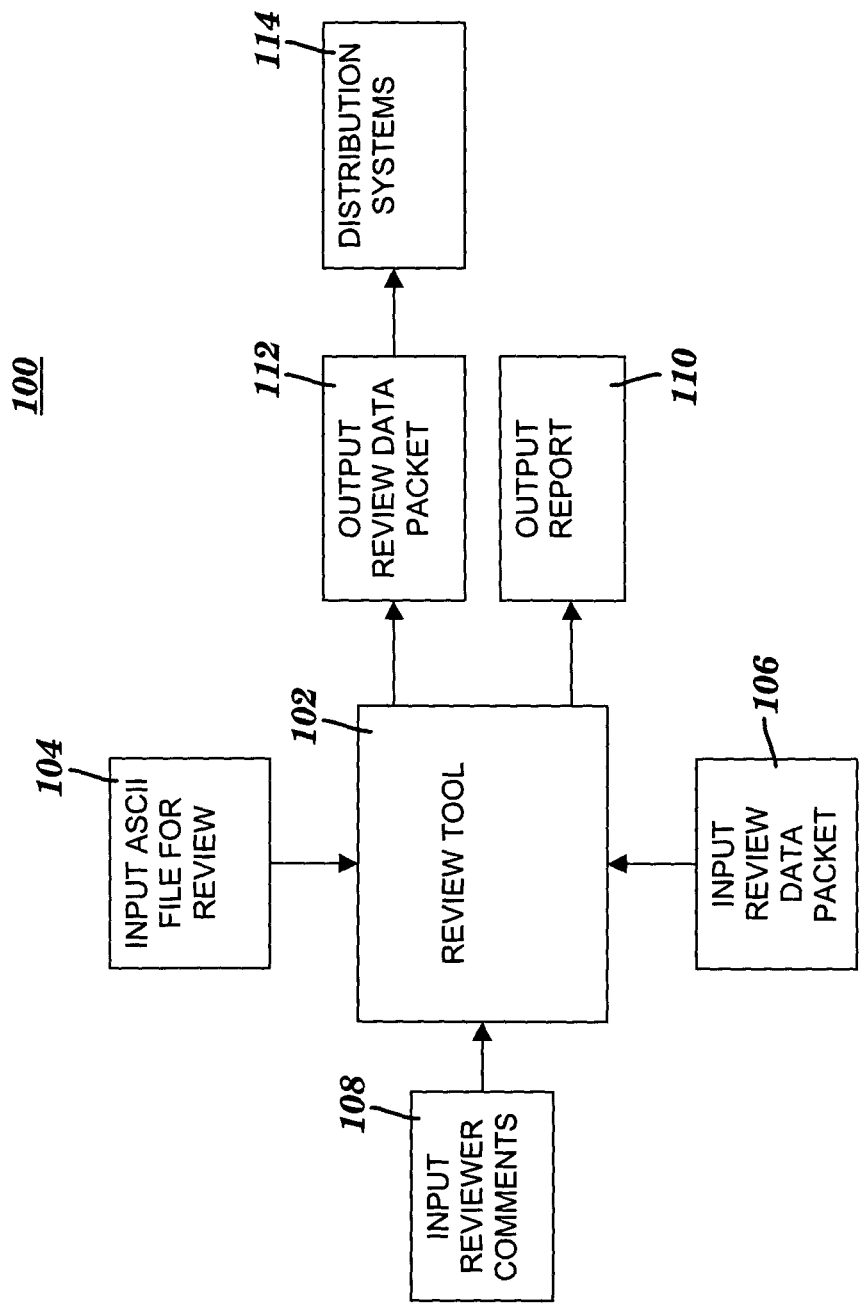
FIG. 1 is a block diagram of a system for reviewing a text file using distributable review data packets, in accordance with embodiments of the present invention.

FIG. 1 is a block diagram of a system for reviewing a text file using distributable review data packets, in accordance with embodiments of the present invention. System 100 includes a review/rework tool 102 (e.g., a software tool for reviewing and updating source code) for reviewing and updating text files stored in ASCII format. The rework features (e.g., updating a text file based on review comments) of review/rework tool 102 are discussed below relative to FIG. 3A. Hereinafter, review/rework tool 102 is referred to simply as review tool 102. As used herein, ASCII is the standard American Standard Code for Information Interchange that uses bit patterns of seven binary digits to represent character information.

During a session of reviewing an ASCII file, review tool 102 receives input of an ASCII file 104, and optional input of a review data packet that includes review comments from one or more other review sessions. A user (e.g., a reviewer) utilizing review tool 102 inputs review comments 108. The processing of input review comments 108 is described below relative to FIG. 2A. Review tool 102 outputs one or more reports 110 that include details and/or summaries of the review comments. These reports 110 are described below relative to FIGS. 2D and 2E. Review tool 102 also outputs a review data packet 112 that includes review comments 108 associated with one or more portions of ASCII file 104, as well as the review comments included in input review data packet 106. The discussion below relative to FIG. 2C describes a review data packet in detail. Output review data packet 112 is distributed to other users of review tool 102 via one or more distribution systems 114. Distribution systems 114 include, for example, an email system, a network file sharing system, a shared central database, or a system that shares files via the File Transfer Protocol (FTP).

Reviewing Text Files

Figure 2A:
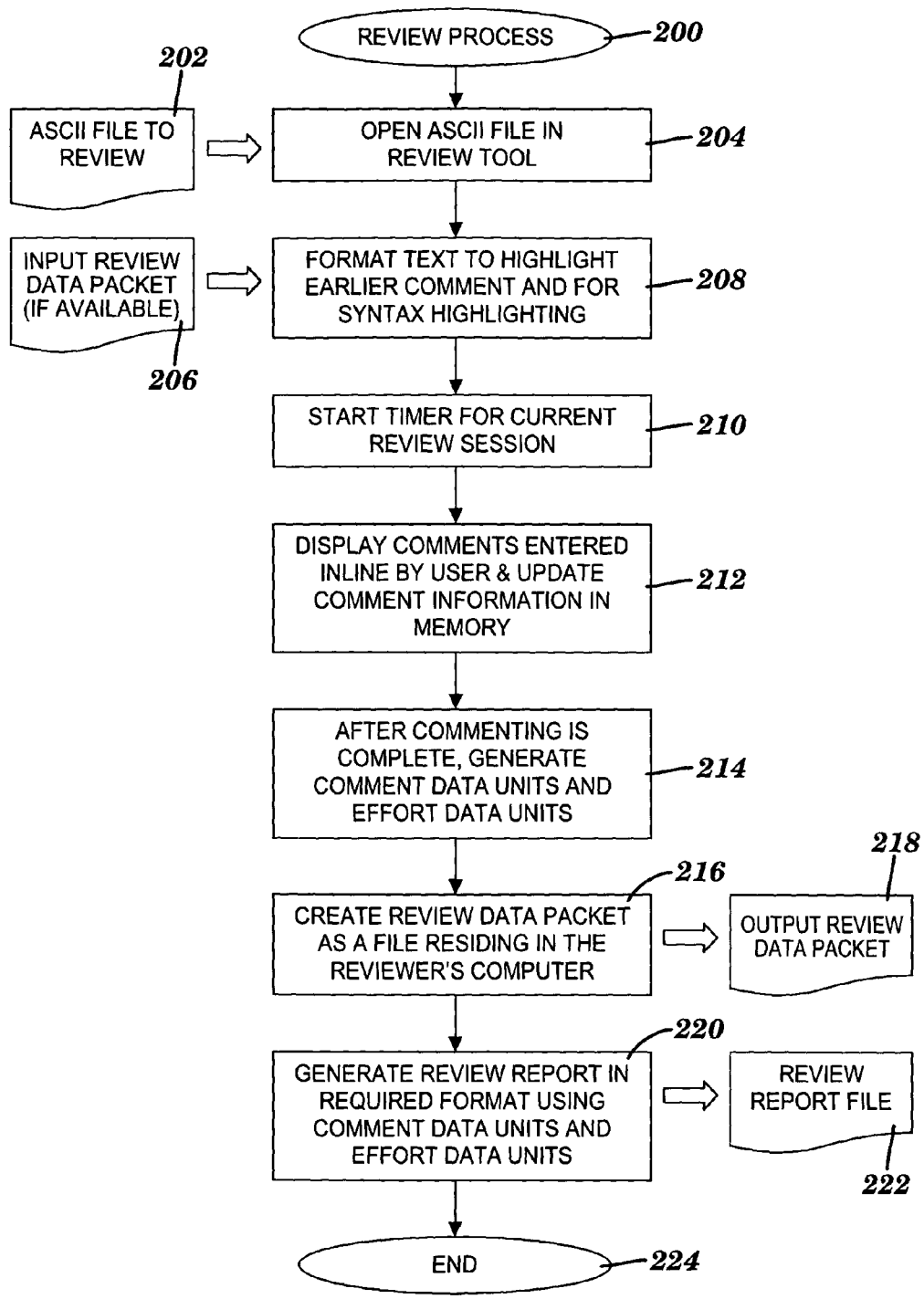
FIG. 2A is a flow chart of a process for reviewing a text file that can be implemented in the system in FIG. 1, in accordance with embodiments of the present invention.

FIG. 2A is a flow chart of a process for reviewing a text file that can be implemented in the system in FIG. 1, in accordance with embodiments of the present invention. The text file review process begins at step 200. The text file being reviewed is an ASCII file that includes source code. A user loads review tool 102 (see FIG. 1) at a computing system (see, e.g., FIG. 5) local to the user. In one embodiment, once the review tool is loaded, the user logs in with a user identification code and password. Review tool 102 (see FIG. 1) authenticates the user logging in by looking up the login information from a file. Alternatively, any other authentication mechanism can be used by appropriately customizing the review tool.

Based on the entered user identification code, review tool 102 (see FIG. 1) maps the user to a particular role (e.g., reviewer, developer or text file owner), which has the authority to perform certain review or rework actions. For example, a user logged in as a reviewer has the authority to enter review comments, but is not authorized to update the text file being reviewed. A user logged in as a developer has the authority to rework (e.g., update) the text file. The features of review tool 102 (see FIG. 1) used by a developer are described below relative to FIG. 3A.

In the example relative to FIG. 2A, the user logs in as a reviewer. After the reviewer logs in, review tool 102 displays an interface by which the reviewer selects an ASCII file 202 to be reviewed. In step 204, selected ASCII file 202 is opened in review tool 102 (see FIG. 1) in read-only mode (i.e., the ASCII file cannot be edited by the reviewer). An input review data packet 206 (input RDP), if available, is input to review tool 102 (see FIG. 1). Input RDP 206 is available for input into review tool 102 (see FIG. 1) if input RDP 206 was generated as an output review data packet (output RDP) by another user in a previous review of ASCII file 202 and distributed to the current reviewer, or if input RDP 206 was generated as an output RDP by the current reviewer in a previous review of ASCII file 202 and available via a storage unit of the reviewer's computer system. Input RDP 206 includes one or more review comments associated with ASCII file 202, along with comment-related data and effort data related to the time spent reviewing ASCII file 202. The type and format of the information included in input RDP 206 match that of an output RDP, and are described in detail below.

In step 208, syntax highlighting is provided for the text of ASCII file 202. Syntax highlighting automatically assigns different colors and/or type styles to certain keywords, variables or function names used in the code of ASCII file 202. In alternate embodiments, the review tool is extended to integrate other programming language features such as compilation. ASCII file 202 is also formatted in step 208 to highlight lines of code associated with previously generated comments (e.g., by using a red foreground color for the lines of text having comments associated therewith). The previously generated comments are provided by, for example, user entries in previous review sessions using review tool 102 (see FIG. 1), which are accessible via input RDP 206.

Previously generated comments can also be provided by a static code analysis tool. One example of a static code analysis tool used to identify Java coding violations is Checkstyle, which is available from Open Source Technology Group, Inc. of Fremont, Calif. In one embodiment, Checkstyle is integrated into and selectable from the interface presented by review tool 102 (see FIG. 1). The reviewer selects Checkstyle and Java coding violation comments are displayed in a list along with corresponding line numbers of the ASCII file. From the displayed list of coding violation comments, the reviewer selects one or more of the Checkstyle comments to be included in a list of comments associated with the current review session. This list of comments is viewable by the reviewer via the interface of review tool 102 (see FIG. 1).

In one embodiment, the interface of review tool 102 (see FIG. 1) is displayed in two sections, where a first section (e.g., left side of a screen display) includes the text of the ASCII file with highlighting as described above relative to step 208, and a second section (e.g., right side of a screen display) includes a list of comment indicators (e.g., in a tree view) indicating each of the comments associated with the displayed ASCII file. The comments associated with the ASCII file are, for instance, the comments included in input RDP 206. The list in the second section of the display includes the ASCII file line number to which the comment refers and the comment's severity level (e.g., Major, Minor, Fatal, etc.). Each comment indicator is for instance, color-coded to represent its severity level. When the user clicks on one of the comment indicators of the list in the second section, the line of code in the first section of the interface that corresponds to that comment is highlighted. When the user places a pointer (e.g., a mouse pointer) on a line in the first section of the interface that is associated with a comment, the comment is displayed along with comment-related information. Comment-related information includes, for instance, the comment's severity level, origin, category, and status, along with the date and time of the comment's entry, and an identification of the user who entered the comment. These types of comment-related information are described in more detail below. The comment and related information are displayed in-line in the same view as the ASCII file being reviewed. As used herein, in-line refers to a display or entry of a comment at the same line in the text file that is associated with the comment.

Review tool 102 (see FIG. 1) includes a timer that the reviewer starts in step 210 to start timing the current review session to track offline an amount of effort expended by the reviewer. The dynamically changing time spent on the current review session is displayed by review tool 102 (see FIG. 1). When the review session is completed, the total time spent on the review session is displayed and saved in response to the reviewer saving the review comments of the current review session (e.g., the reviewer selects Save from the interface of the review tool). The total time spent by each user is stored separately. The reviewer also has the option to toggle the timer between an on and off state where the on state indicates that the review time is being recorded. Using the timer's toggle feature, the reviewer can pause the timer when the reviewer takes a break or otherwise temporarily stops the review session, thereby ensuring that the total time recorded accurately indicates the time that the reviewer is actively performing the review. If a single user accesses ASCII file 202 in multiple review sessions, the timer keeps track of the review time cumulatively across the multiple accesses. That is, the timer starts from a previously stored value after review tool 102 (see FIG. 1) is exited and reopened by a user.

Figure 2B:
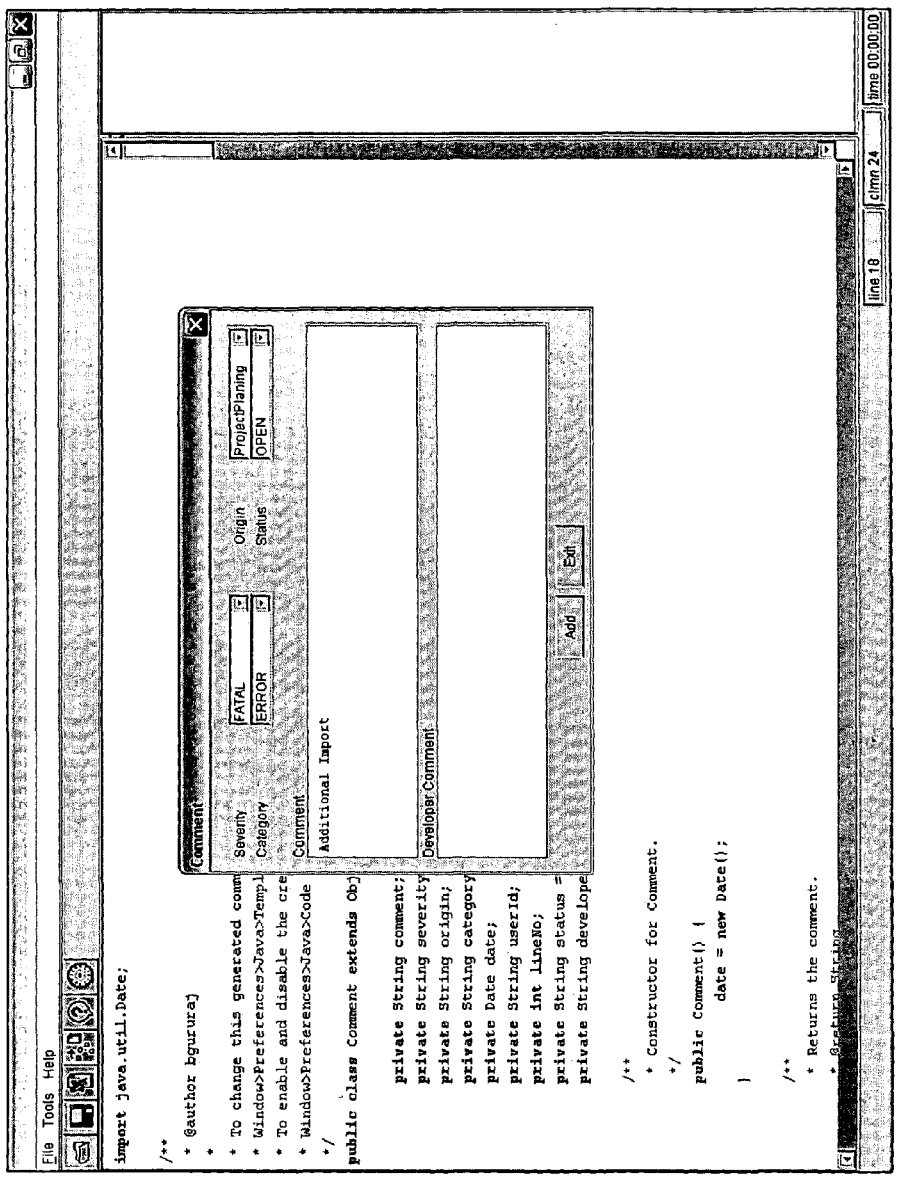
FIG. 2B depicts a screen display including a text file being reviewed and a dialog box for entering a comment as part of the review process of FIG. 2A, in accordance with embodiments of the present invention.
Figure 2C:
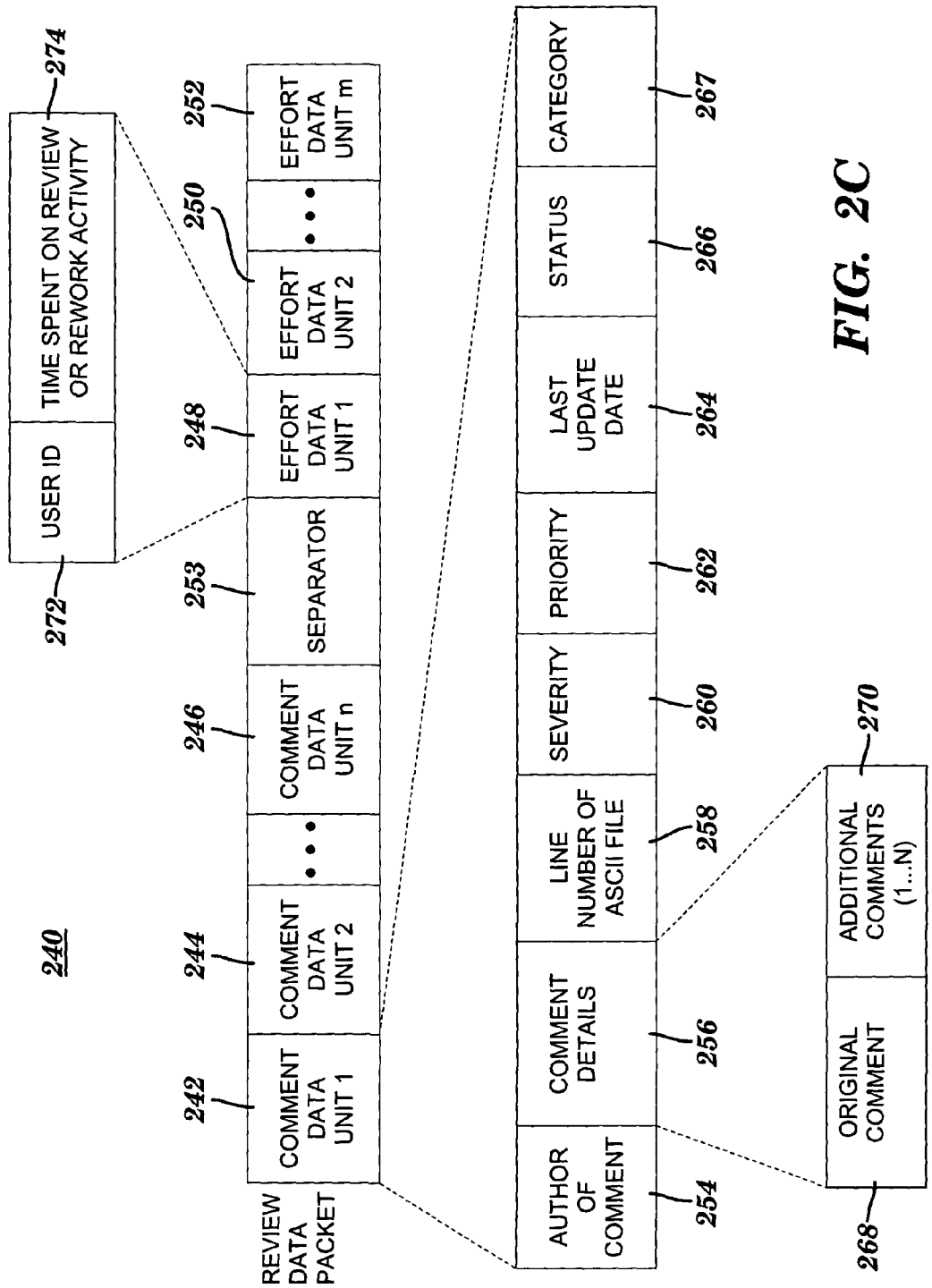
FIG. 2C depicts a data structure of a review data packet employed in the system of FIG. 1 and the review process of FIG. 2A, in accordance with embodiments of the present invention.

The reviewer enters one or more review comments in-line, each of which is associated with a particular line number of ASCII file 202. A screen display 230 in FIG. 2B shows an example of a dialog box in which the reviewer enters a review comment in-line during the process of FIG. 2A, and selects a Severity, Category, Origin, and Status to be associated with the comment as comment-related information. The dialog box in screen 230 is included in the same view as ASCII file 202, and is displayed in response to the reviewer selecting a line of ASCII file 202 to be commented on. To select a line of ASCII file 202 to display the dialog box in screen 230, the reviewer, for example, places the cursor on the text to be commented on and presses the Enter key.

In the dialog box of screen 230, selections for Severity can be, for example, "major," "minor," "fatal" or "suggestion" to describe the severity level of the source code problem being noted by the review comment. Selections for Category classify the comment based on a description of the code problem being commented upon (e.g., "inefficient code structure," "redundant code," "documentation error" or "logic error"). In another example, Category can classify comments generically. Origin classifies the comment based on the stage of a project in which the error was introduced (e.g., "design" or "project planning"). Status identifies the stage of the comment with regard to actions taken to address the code problem. For instance, an "open" status is selected to indicate that no code update has yet occurred relative to the comment, and "closed" is selected for Status after a developer has analyzed the comment and made an appropriate update to the code to address the problem. The values of the classifications of Severity, Category, Origin and Status are configurable, and can be modified, added to, and/or deleted by editing configuration files. In other embodiments, Category and Origin can be combined into a single entity, or they can be eliminated, leaving only Status and Severity in the dialog box of screen 230.

Continuing the process of FIG. 2A at step 212, review tool 102 (see FIG. 1) displays the entered comments and updates the comments and comment-related information in memory. After the entering of review comments is complete for the current review session, review tool 102 (see FIG. 1) generates comment data units and an effort data unit in step 214. Comment data units and effort data units are described below relative to FIG. 2C. The completion of the current review session is indicated, for example, by the reviewer clicking on a Save button included in the interface of review tool 102 (see FIG. 1).

Figure 5:
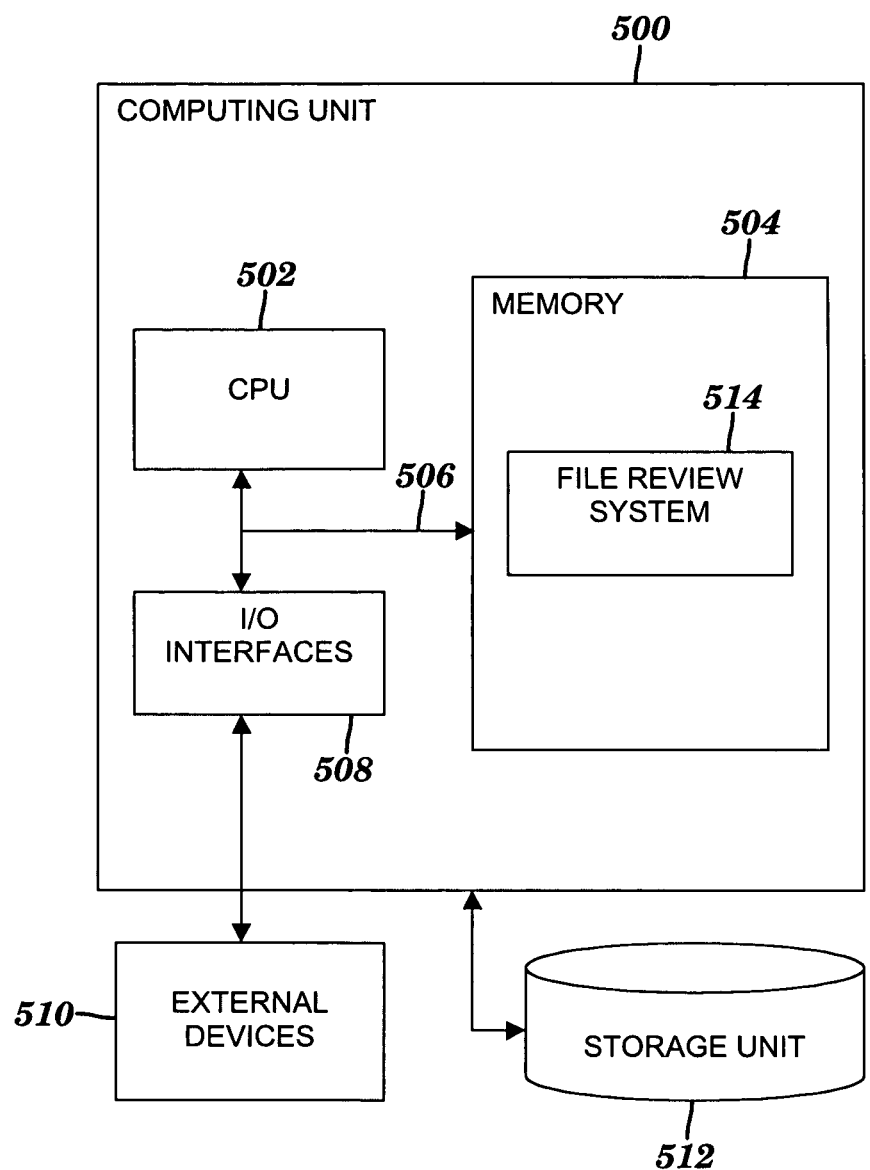
FIG. 5 is a block diagram of a computing system for implementing the review of a text file for the system of FIG. 1, in accordance with embodiments of the present invention.

Step 216 creates an output RDP 218 for the current review session as a file (e.g., an ASCII file) residing on a computer system local to the reviewer (see, e.g., FIG. 5). During a review session, there is one output RDP created for each text file reviewed. The file that stores output RDP 218 is separate from ASCII file 202. Output RDP file 218 is identified by a file name that is, for instance, the same name as ASCII file 202, but which has a different file extension (e.g., a .crf extension). As output RDP 218 is stored as a computer file, the file can be easily shared via a network or database, emailed, and/or FTP enabled to make the file available in a distributed environment. That is, output RDP file 218 can be distributed to, or shared with, other users of review tool 102 (see FIG. 1) via one or more of distribution systems 114 (see FIG. 1).

Output RDP file 218 generated in step 216 includes one or more comment data units and one or more effort data units stored in, for example, a delimited data format. An example of output RDP 218 is RDP 240 of FIG. 2C. RDP 240 includes n comment data units 242, 244 . . . 246 and m effort data units 248, 250 . . . 252. In RDP 240, the comment data units and effort data units are separated by a separator field 253. Each comment data unit includes multiple fields of data related to a specific comment. For instance, comment data unit 242 includes an author of a comment 254 (e.g., a user ID), details of the comment 256, a line number 258 of the ASCII file (i.e., the line number associated with the comment), the comment's severity level 260, priority level 262, last update date 264, status 266 and category 267. Comment details 256 include an original comment 268 and N additional comments 270. Original comment 268 is entered by the reviewer during the review process of FIG. 2A. Additional comments 270 are entered by, for example, a developer during a rework process described below relative to FIG. 3A. Each effort data unit 248, 250, 252 includes fields of data associated with an effort expended by a particular user in reviewing or reworking ASCII file 202. For example, effort data unit 248 includes a user identification 272 and an amount of time spent by the identified user on a review or rework activity 274. This amount of time is tracked by the timer started in step 210 of FIG. 2A.

If an input RDP 206 had been input into the review tool during the current review session, then output RDP 218 is an update of the data units in input RDP 206. For example, the comment data units and the effort data unit of step 214 are added to the one or more comment data units and one or more effort data units already included in input RDP 206 to form output RDP 218. Otherwise, if the current review session did not include an input RDP 206, then output RDP 218 is a newly created RDP whose comment data units and effort data unit are the data units generated in step 214 of the current review session.

Output RDP 218 is distributed to a recipient user of a computing system that utilizes, offline, the comments and line numbers in RDP 218 to display one or more selected comments together with their associated lines of text of ASCII file 202. In one example, the recipient user utilizes RDP 218 as an input RDP 206 in another review process. Alternatively, the recipient user is a developer who is updating ASCII file 202, and uses the received RDP 218 as an input RDP in a rework process discussed below relative to FIG. 3A.

Since output RDP 218 and the text being reviewed are stored in separate files, the distribution or sharing of output RDP file 218 does not require distribution of ASCII file 202 itself, and therefore the present invention facilitates ensuring the security of the ASCII file contents. If necessary, the contents of output RDP 218 can be encrypted prior to its distribution. Further, output RDP file 218 includes a relatively small amount of review data, and therefore the output RDP file distribution advantageously requires a relatively small amount of network bandwidth.

Moreover, the present invention maintains the integrity of the ASCII file being reviewed. The content and format of ASCII file 202 remain unchanged during the review process of FIG. 2A. Further, no other version of ASCII file 202 needs to be created by a conversion process to facilitate the review process. For instance, ASCII file 202 does not have to be converted to a file that uses a markup language such as HTML or XML.

Returning to the review process of FIG. 2A, the reviewer optionally selects a report format from the interface of review tool 102 (see FIG. 1). In step 220, a review report is generated offline in the selected format, and displayed onscreen and/or stored on the reviewer's computer system as a report file 222, and the review process ends at step 224. The generation of report in step 220 utilizes the comment data units and/or the effort data units of output RDP 218. One example of a review report generated in step 220 is a two-part report in spreadsheet format (e.g., Microsoft® Excel® format), as shown by a first sheet 280 of FIG. 2D and a second sheet 290 of FIG. 2E. The generation of this sample spreadsheet report can be facilitated by a tool such as JExcel integrated in the interface of review tool 102 (see FIG. 1). The sample report's first sheet 280 of FIG. 2D lists comments and their respective line numbers of the associated ASCII file. For each comment on sheet 280, there is also data indicating Severity, Category, Origin, Status, Comment Author, and Comment Date, which are included in the comment data units of RDP 218 (see FIG. 2A).

Figure 2E:
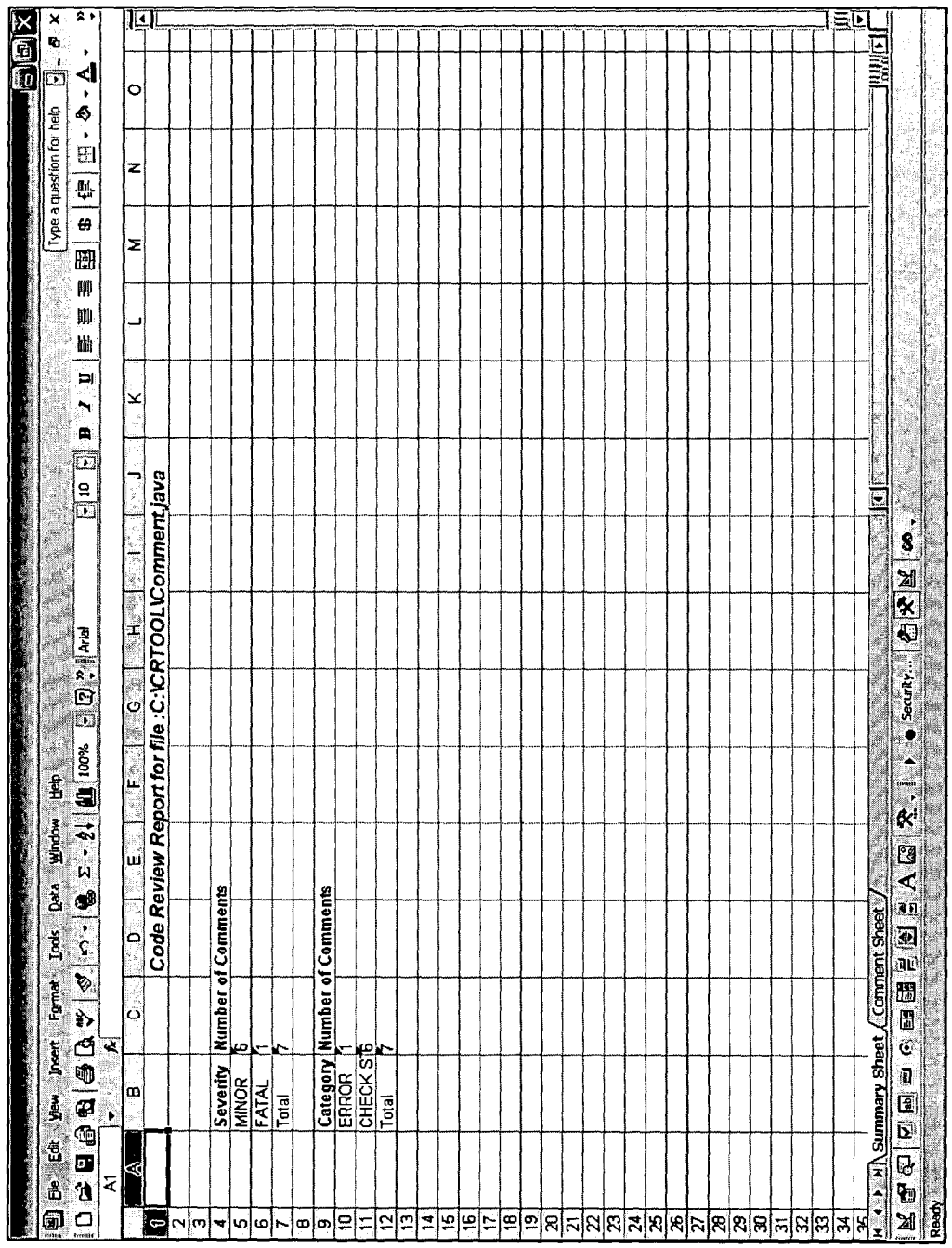
FIG. 2E depicts summary information in a report generated by the system of FIG. 1, in accordance with embodiments of the present invention.

The sample report's second sheet 290 of FIG. 2E summarizes the number of comments for each value of the Severity column of first sheet 280 (see FIG. 2D) and the number of comments for each value of the Category column of first sheet 280 (see FIG. 2D). Summarizing the number of comments by Severity and Category in FIG. 2E is merely an example, and any of the columns of first sheet 280 can be selected to be included in a report that includes subtotals for the number of comments corresponding to each value of the selected column.

Review tool 102 (see FIG. 1) can also generate a consolidated report showing the summary information described above for a plurality of reviewed files. Further, the review tool can be modified to export the reports to other types of file formats.

The process of FIG. 2A is performed by multiple reviewers, each reviewing the same ASCII file 202, or copies of the same ASCII file 202. If each of the multiple reviewers inputs the same input RDP 206, then input RDP 206 together with ASCII file 202 being reviewed provide a consistent view via review tool 102 (see FIG. 1) to each of the multiple reviewers, even if the computing systems being used by the reviewers to run the review tool are not all the same.

Each of the multiple reviewers generates an output RDP 218 on a computing system local to the reviewer. The output RDPs are not required to reside in a central repository, and therefore the review process of FIG. 2A does not depend on any of the multiple reviewers having network or database access.

The generation and storage of each output RDP 218 in the process of FIG. 2A can be performed offline, without any centralized control. As used herein, performing a computer-based action offline is defined as using a computing system to perform the action without using a connection to the Internet, an online service, or an internal network, without accessing a shared resource such as a shared database, and without being connected to any other computing system. Although the output RDPs are not required to reside in a central repository, they may be stored centrally using a third party tool such as a configuration management tool.

The multiple reviewers can perform the process of FIG. 2A simultaneously, with each reviewer utilizing review tool 102 (see FIG. 1) on a different computing system. For the review process of FIG. 2A to be simultaneously performed by multiple users, at least part of one user's inputting of a first comment overlaps the same time period as at least part of another user's inputting of a second comment, or one user's inputting of a portion of a first comment occurs during another user's inputting of a second comment. The simultaneous review feature allows a large ASCII file to be reviewed in sections, with each reviewer reviewing one section, thereby quickening the review process. Alternatively, the same section of a single ASCII file can be reviewed simultaneously by different reviewers using different, unrelated computing systems. RDPs generated by multiple reviewers can be merged to provide a single, consolidated RDP to a developer or ASCII file owner who has the authority to update the ASCII file based on the comments included in the consolidated RDP. Merging RDPs is discussed below relative to FIG. 4.

Although in the discussion above relative to FIG. 2A, the user of review tool 102 (see FIG. 1) is reviewing an ASCII file that includes source code of a computer program, the present invention also contemplates reviewing an ASCII file that is not source code, such as property files (i.e., configuration files), readme and instruction files, and any other text file. Further, enhancements to review tool 102 (see FIG. 1) can allow the review and rework processes described herein to utilize types of text files in a format other than standard ASCII (e.g., extended ASCII, ISO Latin-1, Unicode, EBCDIC, etc.). Still further, it will be apparent to those skilled in the art that version control tool capabilities can be added to review tool 102 (see FIG. 1) to track a version of the reviewed text file that corresponds to a particular RDP.

Reworking Text Files

Figure 3A:
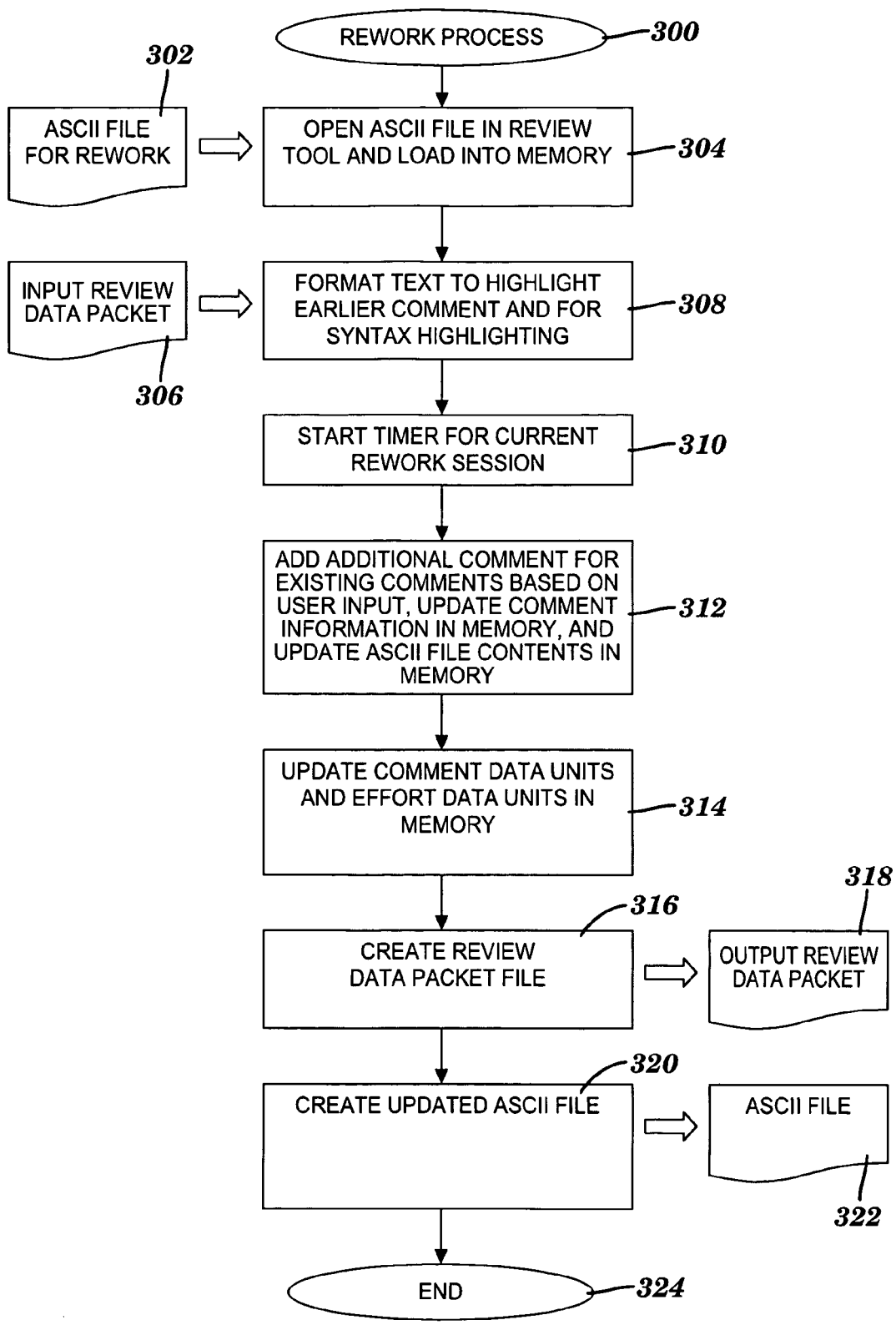
FIG. 3A is a flow chart of a process for reworking a text file reviewed by the process of FIG. 2A, in accordance with embodiments of the present invention.

FIG. 3A is a flow chart of a process for reworking a text file reviewed by the process of FIG. 2A. The text file rework process is performed offline and begins at step 300. The text file being reworked is an ASCII file 302 that includes, for example, source code. ASCII file 302 may be, for instance, ASCII file 202 that was reviewed via the process of FIG. 2A. In the example of FIG. 3A, the source code of the ASCII file includes errors to be corrected by a user of review tool 102 (see FIG. 1). The user logs into review tool 102 (see FIG. 1) with a user identification and a password. Review tool 102 (see FIG. 1) authenticates the user logging in as having a role that has authority to rework an ASCII file. As used herein, the authority to rework an ASCII file is defined as the authority to (1) update the text of the ASCII file, (2) enter one or more comments (a.k.a. "additional comments") associated with one or more portions of the ASCII file that were previously commented upon via the review process of FIG. 2A, and (3) update the status of previously entered comments associated with the ASCII file. In this example, the user logs in as a developer.

After the reviewer logs in, review tool 102 (see FIG. 1) displays an interface by which the developer selects ASCII file 302 to be reworked. In step 304, selected ASCII file 302 is opened in review tool 102 (see FIG. 1) in editable mode, and is loaded into memory. An input RDP 306 is input into review tool 102 (see FIG. 1). Input RDP 306 is, for example, a consolidated RDP that is the result of a merging of a plurality of output RDPs generated by multiple reviewers of the selected ASCII file utilizing the review process of FIG. 2A. Merging RDPs is discussed below relative to FIG. 4.

In step 308, the text of ASCII file 302 is formatted to highlight the code lines associated with previously entered comments and to provide syntax highlighting. The displayed highlighting matches the highlighting discussed above relative to step 208 of FIG. 2A.

The review tool's interface presented to the developer is the same as the interface presented to a reviewer, which is described above relative to FIG. 2A. This single interface utilized by both the developer and the reviewer allows the location of comments to be specified in a precise manner that facilitates, for instance, an unambiguous communication of an error in source code being reviewed. As described above, the displayed interface presents a first section that includes the contents of the ASCII file and a second section that displays a summary view including comment indicators. The comment indicators include the line numbers and severity levels of review comments associated with ASCII file 302. Comments are viewable in-line as described above relative to FIG. 2A.

In step 310, the developer starts a timer provided by review tool 102 (see FIG. 1) to time the current rework session. The features described above relative to timing a review session are also available for timing a rework session.

For the comments previously generated and associated with selected ASCII file 302 via the review process of FIG. 2A, the developer has the option in step 312 to view each review comment in-line and update the status of each review comment in-line. In step 312, the developer also updates the text of ASCII file 302 to correct, for example, an error in a line of source code. The developer updates the text of ASCII file 302 in a manner similar to using a text editor such as Microsoft® Notepad (e.g., by typing text to insert new text, using the Delete key to delete text, etc.). The viewing of comments, updating of comment status, and updating of ASCII file text in step 312 is performed by the developer offline.

Figure 3B:
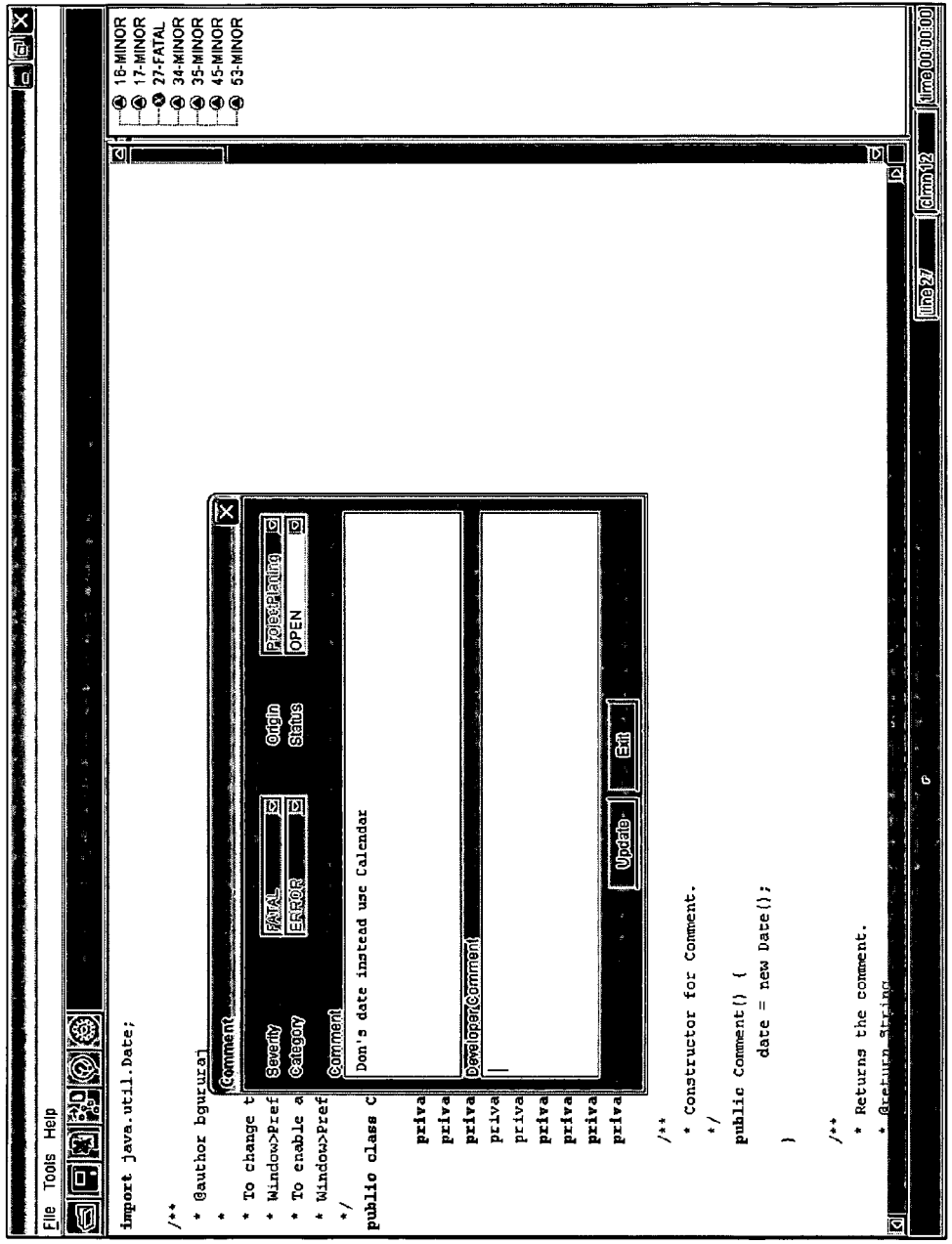
FIG. 3B depicts a screen display including a text file being reworked by the process of FIG. 3A, and a dialog box for entry of an additional comment as part of the process of FIG. 3A, in accordance with embodiments of the present invention.

To update comment information (e.g., update a review comment's status or enter an additional comment), the developer selects a menu option to update a comment. The menu is, for example, a pop-up menu displayed by right-mouse clicking on a line in the first section of the interface, wherein the line is associated with the comment whose information is to be updated. In response to selecting the menu option to update the comment, the review comment is displayed along with related comment information (e.g., Severity, Category, Origin and Status). The displayed comment and related information is presented in-line in a dialog box as shown in screen 330 of FIG. 3B. Using the dialog box of FIG. 3B, the developer enters an additional comment in the Developer Comment field, and updates the Status of the comment by changing the Status, for example, from Open to Closed. Step 312 also updates memory of the developer's computing system to reflect changes to the status of review comments and changes to the contents of ASCII file 302.

In step 314, comment data units and effort data units are updated in memory. The comment data units are updated to include the additional comments added in step 312 and the updates to the status of comments. Effort data units are updated to include a new effort data unit that includes a user identification for the developer and the time the developer spent reworking ASCII file 302 according to the timer started in step 310.

In response to the developer indicating a completion of the rework of ASCII file 302 (e.g., by selecting Save on a user interface presented by the review tool), step 316 generates an output RDP 318 file that includes the data of step 314. Also in response to the completion of the rework, step 320 creates an updated ASCII file 322, which is ASCII file 302 modified by the updating of the ASCII file contents performed in step 312. The rework process ends at step 324.

Similar to the review process of FIG. 2A, the rework process of FIG. 3A acts upon ASCII file 302 itself, without requiring the ASCII file to be converted to another file in another format (e.g., HTML). Further, although the example presented above relative to FIG. 3A reworks source code in ASCII file 302, the reworking process also applies to other types of text files, as described above in the discussion of the review process of FIG. 2A.

Merging RDPs

Figure 4:
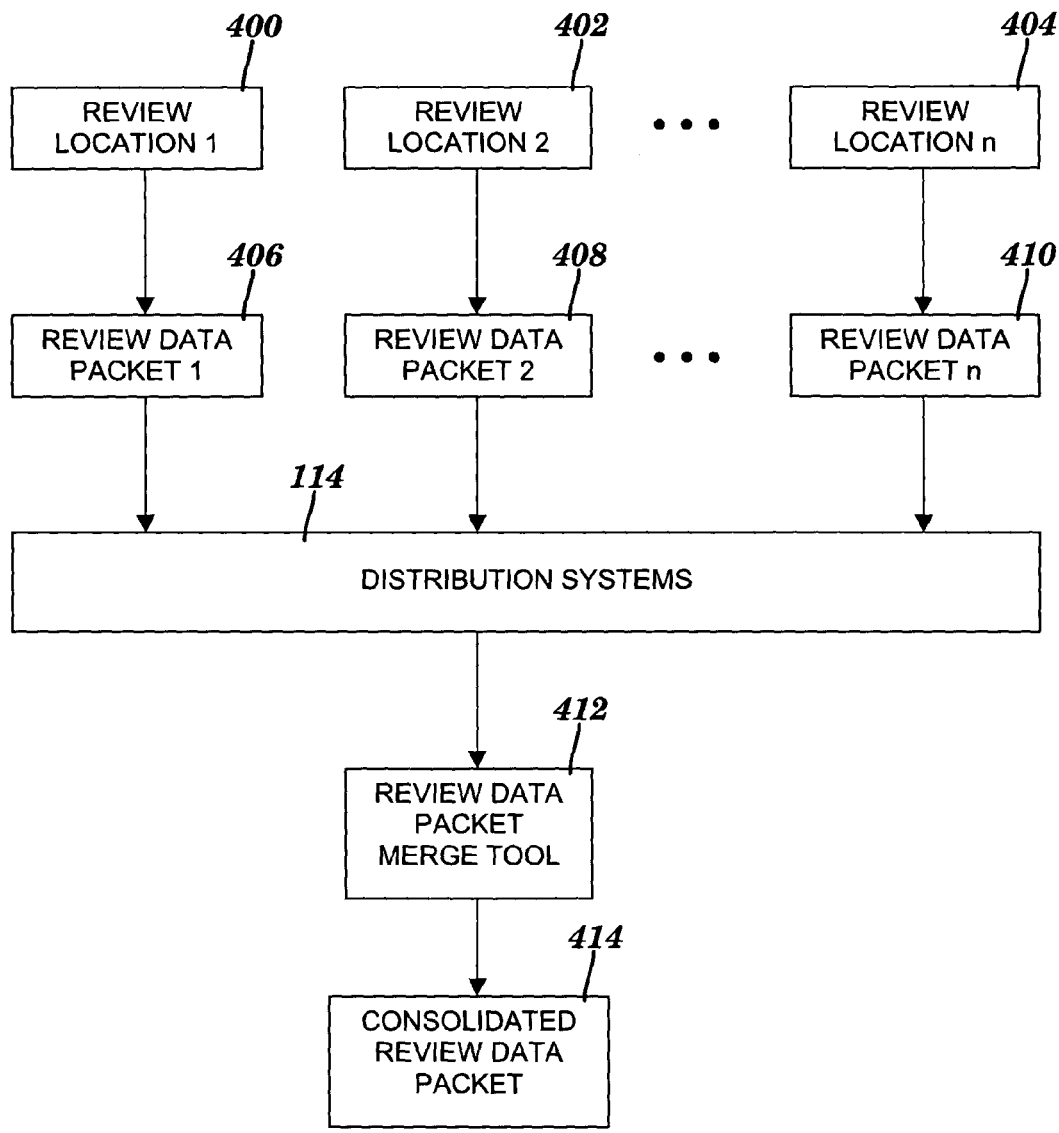
FIG. 4 is a flow diagram showing a generation of a consolidated review data packet from multiple review data packets, in accordance with embodiments of the present invention.

FIG. 4 is a flow diagram showing a generation of a consolidated review data packet from multiple review data packets, in accordance with embodiments of the present invention. Each location of a plurality of review locations 400, 402, 404 is a computing system that includes review tool 102 (see FIG. 1) being utilized by a reviewer. Utilizing their respective review tools, the reviewers at the plurality of review locations 400, 402, 404 generate and store a plurality of RDPs 406, 408, 410. In the example of FIG. 4, n RDPs are generated from n review locations, one RDP being generated per review location. The RDPs 406, 408, 410 are output RDPs generated as described above relative to FIG. 2A. In one embodiment, the reviewers utilize review tool 102 (see FIG. 1) to generate the RDPs 406, 408, 410 offline and simultaneously.

After being generated, RDPs 406, 408, 410 are each distributed without ASCII file 202 (see FIG. 2A) via one or more distribution systems 114 (e.g., email, FTP, network, and/or shared database) to a review data packet merge tool 412. RDPs 406, 408, 410 are all distributed via the same type of distribution system, or some or all of RDPs 406, 408, 410 are distributed via different distribution systems. Merge tool 412 generates offline a consolidated RDP 414 that includes all the comment data units and effort data units of RDPs 406, 408, 410. In one embodiment, a user authorized to rework ASCII file 202 (see FIG. 2A) utilizes consolidated RDP 414 as input review data packet 306 (see FIG. 3A) during the rework process of FIG. 3A. Merge tool 412 may optionally reside in a central computing system that includes a central repository of review comments. Even if review comments reside in a merged RDP in a central repository, reviewers still have the ability to perform the review process of FIG. 2A in a standalone or offline manner.

Computer System for Reviewing Text Files

FIG. 5 is a block diagram of a computing system for implementing the review of a text file for the system of FIG. 1, in accordance with embodiments of the present invention. A computer system 500 generally includes a central processing unit (CPU) 502, a memory 504, a bus 506, input/output (I/O) interfaces 508, external devices/resources 510, and a storage unit 512. CPU 502 may comprise a single processing unit, or may be distributed across one or more processing units in one or more locations. Memory 504 may comprise data storage, such as magnetic media, optical media, random access memory (RAM), and read-only memory (ROM). Memory 504 may reside at a single physical location, comprising one or more types of data storage, or be distributed across a plurality of physical systems in various forms.

I/O interfaces 508 include a system for exchanging information from external sources such as external devices 510. External devices 510 may comprise conventional external devices including speakers, a display monitor, keyboard, mouse, printer, plotter, facsimile, pager, handheld device, etc.

Bus 506 interconnects CPU 502, memory 504 and I/O interfaces 508. Bus 506 comprises a known type of transmission link, such as electrical, optical, wireless, etc. In addition, although not shown, additional components such as cache memory and communication systems may be incorporated into computer system 500.

Shown in memory 504 is a file review system 514 that includes one or more computer programs implementing the text file review logic and/or the text file rework logic depicted in the flow diagrams of FIGS. 2A and 3A. CPU 502 suitably executes one or more computer programs of file review system 514. In one embodiment, CPU 502 executes an algorithm implementing the logic depicted in the flow diagram of FIG. 2A and/or FIG. 3A.

Computer system 500 can be connected to one or more other computers via a communication interface using an appropriate communication channel (not shown) such as a modem communications path, a computer network, or the like. The computer network (not shown) may include a local area network (LAN), a wide area network (WAN), intranet, and/or the Internet. This communication interface is not required to perform the review and rework processes of FIGS. 2A and 3A.

Storage unit 512 is a system (e.g., database) providing storage for data under the present invention, such as an ASCII file to be reviewed and reworked, and one or more review data packets generated or received by computer system 500. Storage unit 512 can include one or more storage devices, such as a magnetic disk drive or an optical disk drive. One example of storage unit 512 is a CD-ROM drive that receives a CD-ROM disk.

A computer system 500 in accordance with the present invention is, for example, a personal computer. However, those skilled in the art will appreciate that the methods and apparatus of the present invention apply equally to any computing system, regardless of whether the computer system is a complicated multi-user computing apparatus or a single user device such as a workstation.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Thus, the present invention discloses a method for deploying or integrating computing infrastructure, comprising integrating computer-readable code into computer system 500, wherein the code in combination with computer system 500 is capable of performing a process of reviewing and reworking a text file.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided. The program storage device can be an electronic, magnetic, optical, electromagnetic, infrared, or semiconductor device (or apparatus or system). Examples of a program storage device include a removable computer diskette, magnetic tape, a random access memory (RAM), a read-only memory (ROM), a rigid magnetic disk, an optical disk (e.g., CD-ROM), and a semiconductor or solid state memory.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of reviewing a text file by a plurality of users, said plurality of users including a first user utilizing a first computing unit and a second user utilizing a second computing unit, said method comprising:

said first computing unit receiving offline, from said first user utilizing said first computing unit, a first comment associated with a first portion of said text file, wherein said first computing unit receiving offline said first comment includes said first computing unit receiving said first comment without using a connection from said first computing unit to the Internet, without using a connection from said first computing unit to an online service, without using a connection from said first computing unit to an internal network, without said first computing unit accessing a shared resource, and without said first computing unit being connected to another computing unit, wherein said text file includes a source code, and wherein said first comment indicates a first problem with said source code;

said first computing unit receiving a first selection offline of a first level of severity of said first problem with said source code;

said first computing unit receiving a first open status offline, wherein said first computing unit receiving said first open status offline includes said first computing unit receiving said first open status without using said connection from said first computing unit to the Internet, without using said connection from said first computing unit to said online service, without using said connection from said first computing unit to said internal network, without said first computing unit accessing said shared resource, and without said first computing unit being connected to another computing unit, and wherein said first open status indicates an update to said source code to solve said first problem with said source code has not yet occurred;

said second computing unit receiving offline, from said second user utilizing said second computing unit, a second comment associated with a second portion of said text file, wherein said second computing unit receiving offline said second comment includes said second computing unit receiving said second comment without using a connection from said second computing unit to the Internet, without using a connection from said second computing unit to said online service, without using a connection from said second computing unit to said internal network, without said second computing unit accessing said shared resource, and without said second computing unit being connected to another computing unit, and wherein said second comment indicates a second problem with said source code;

said second computing unit receiving a second selection offline of a second level of severity of said second problem with said source code;

said second computing unit receiving a second open status offline, wherein said second computing unit receiving said second open status offline includes said second computing unit receiving said second open status without using said connection from said second computing unit to the Internet, without using said connection from said second computing unit to said online service, without using said connection from said second computing unit to said internal network, without said second computing unit accessing said shared resource, and without said second computing unit being connected to another computing unit, and wherein said second open status indicates an update to said source code to solve said second problem with said source code has not yet occurred;

automatically obtaining, by said first computing unit, a first location of said first portion within said text file;

automatically obtaining, by said second computing unit, a second location of said second portion within said text file;

automatically generating, by a processor of said first computing unit, a first review data packet (RDP) consisting of a first plurality of comment data units, a first plurality of effort data units, and a first separator field separating said first plurality of comment data units from said first plurality of effort data units, said first plurality of comment data units including a first comment data unit related to said first comment, said first comment data unit consisting of an author of said first comment, said first comment, a first line number of said text file, said first level of severity of said first problem with said source code, a first level of priority of said first problem, a date of a last update of said first RDP, said first open status indicating a status of actions to address said first problem, and a category of said first comment, said first line number being associated with said first comment and indicating said first location, said first RDP being a first computer file stored in said first computing unit separately from said text file, wherein said first plurality of effort data units includes a first effort data unit consisting of an identifier of said first user and an amount of time spent by said first user on a review of said text file;

automatically generating, by a processor of said second computing unit, a second RDP consisting of a second plurality of comment data units, a second plurality of effort data units, and a second separator field separating said second plurality of comment data units from said second plurality of effort data units, said second plurality of comment data units including a second comment data unit related to said second comment, said second comment data unit consisting of an author of said second comment, said second comment, a second line number of said text file, said second level of severity of said second problem with said source code, a second level of priority of said second problem, a date of a last update of said second RDP, said second open status indicating a status of actions to address said second problem, and a category of said second comment, said second line number being associated with said second comment and indicating said second location, said second RDP being a second computer file stored in said second computing unit separately from said text file, wherein said second plurality of effort data units includes a second effort data unit consisting of an identifier of said second user and an amount of time spent by said second user on a review of said text file;

distributing said first and second RDPs without said text file to a third computing unit utilized by a third user of said plurality of users, wherein said third user is authorized to rework said text file, and wherein said distributing said first and second RDPs to said third computing unit utilized by said third user is performed without requiring said third user to have access to a central data repository;

in a first section of a display, said third computing unit displaying a list of entries including first and second entries, said first entry including a first indicator of said first comment and said first level of severity of said first problem with said source code, and said second entry including a second indicator of said second comment and said second level of severity of said second problem with said source code;

based on said first indicator of said first comment and said first level of severity of said first problem with said source code included in said first entry in said displayed list in said first section of said display, said third computing unit receiving a first selection by said third user of said first indicator of said first comment from said first section of said display;

based on said received first selection of said first indicator of said first comment from said first section of said display, said third computing unit displaying, in a second section of said display different from said first section, said first comment together with said first portion of said text file, said first open status, said category of said first comment, and said first level of severity of said first problem with said source code by said third computing unit retrieving offline from said first RDP said first comment, said first open status, said first line number, said category of said first comment, and said first level of severity, wherein said third computing unit retrieving offline from said first RDP is performed without using a connection from said third computing unit to the Internet, without using a connection from said third computing unit to said online service, without using a connection from said third computing unit to said internal network, without said third computing unit accessing said shared resource, and without said third computing unit being connected to another computing unit;

based on said second indicator of said second comment and said second level of severity of said second problem with said source code included in said second entry in said displayed list in said first section of said display, said third computing unit receiving a second selection by said third user of said second indicator of said second comment from said first section of said display;

based on said received second selection of said second indicator of said second comment from said first section of said display, said third computing unit displaying, in said second section of said display, said second comment together with said second portion of said text file, said second open status, said category of said second comment, and said second level of severity of said second problem with said source code by said third computing unit retrieving offline from said second RDP said second comment, said second open status, said second line number, said category of said second comment, and said second level of severity, wherein said third computing unit retrieving offline from said second RDP is performed without using said connection from said third computing unit to the Internet, without using said connection from said third computing unit to said online service, without using said connection from said third computing unit to said internal network, without said third computing unit accessing said shared resource, and without said third computing unit being connected to another computing unit;

based on said first portion of said text file, said first comment, said first open status, said category of said first comment, and said first level of severity of said first problem with said source code displayed in said second section of said display, said third computing unit receiving from said third user said update to said source code to solve said first problem with said source code; and said third computing unit receiving a closed status to update said first open status, wherein said closed status indicates said update to said source code to solve said first problem with said source code has occurred.

2. The method of claim 1, wherein said receiving said first comment comprises said first computing unit receiving a first input by said first user of a portion of said first comment, wherein said receiving said second comment comprises said second computing unit receiving a second input by said second user of said second comment, and wherein said first input by said first user is during said second input by said second user.

3. The method of claim 1, wherein said distributing said first and second RDPs to said third computing unit utilized by said third user includes sharing said first and second RDPs with said third computing unit via an electronic mail system.

4. The method of claim 1, further comprising:
said third computing unit receiving one or more comments input by said third user, wherein said one or more comments are associated with said first portion of said text file; and
said third computing unit storing said one or more comments and said closed status input by said third user in a consolidated RDP that includes said first comment, said first line number, said second comment, and said second line number.

5. The method of claim 1, further comprising:
merging said first RDP and second RDP into a consolidated RDP including said author of said first comment, said first comment, said first line number of said text file, said first level of severity, said first level of priority of said first problem, said date of said last update of said first RDP, said first open status, said category of said first comment, said author of said second comment, said second comment, said second line number of said text file, said second level of severity, said second level of priority of said second problem, said date of said last update of said second RDP, said second open status, and said category of said second comment, said consolidated RDP being stored as a third computer file;
distributing said consolidated RDP to said third computing unit without said text file, wherein said distributing said consolidated RDP includes said distributing said first and second RDPs; and
based on said consolidated RDP including said first comment, said first line number, said first level of severity of said first problem with said source code, said first open status, said second comment, said second line number, said second level of severity of said second problem with said source code, and said second open status, said third computing unit receiving a rework of said text file by said third user, wherein said rework includes said update to said source code to solve said first problem and an update to said source code to solve said second problem with said source code.

6. The method of claim 1, wherein said receiving said first comment includes receiving a first input by said first user via a first user interface, wherein said receiving said update to said source code includes receiving a second input by said third user via a second user interface, and wherein said first and second user interfaces are identical.

7. The method of claim 1, further comprising maintaining contents and a format of said text file during said receiving said first comment, receiving said second comment, obtaining said first location, obtaining said second location, generating said first RDP, and generating said second RDP, wherein said maintaining preserves said text file as unmodified in said contents and said format, and preserves said text file as unconverted to another file of a second format different from said format of said text file.

8. A system for reviewing a text file by a plurality of users, said plurality of users including a first user utilizing a first computing unit and a second user utilizing a second computing unit, said system comprising:
a first processor and a first computer-readable memory unit in said first computing unit, said first computer-readable memory unit coupled to said first processor;
a second processor and a second computer-readable memory unit in said second computing unit, said second computer-readable memory unit coupled to said second processor;
means for receiving offline, by first computing unit, a first comment associated with a first portion of said text file, wherein said means for receiving offline said first comment includes means for receiving, by said first computing unit, said first comment without using a connection from said first computing unit to the Internet, without using a connection from said first computing unit to an online service, without using a connection from said first computing unit to an internal network, without said first computing unit accessing a shared resource, and without said first computing unit being connected to another computing unit, wherein said text file includes a source code, and wherein said first comment indicates a first problem with said source code;
means for receiving a first selection offline of a first level of severity of said first problem with said source code;
means for receiving, by said first computing unit, a first open status offline, wherein said means for receiving said first open status offline includes means for receiving, by said first computing unit, said first open status without using said connection from said first computing unit to the Internet, without using said connection from said first computing unit to said online service, without using said connection from said first computing unit to said internal network, without said first computing unit accessing said shared resource, and without said first computing unit being connected to another computing unit, and wherein said first open status indicates an update to said source code to solve said first problem with said source code has not yet occurred;
means for receiving offline, by said second computing unit, a second comment associated with a second portion of said text file, wherein said means for receiving offline said second comment includes means for receiving, by said second computing unit, said second comment without using a connection from said second computing unit to the Internet, without using a connection from said second computing unit to said online service, without using a connection from said second computing unit to said internal network, without said second computing unit accessing said shared resource, and without said second computing unit being connected to another computing unit, and wherein said second comment indicates a second problem with said source code;
means for receiving a second selection offline of a second level of severity of said second problem with said source code;
means for receiving, by said second computing unit, a second open status offline, wherein said means for receiving said second open status offline includes means for receiving, by said second computing unit, said second open status without using said connection from said second computing unit to the Internet, without using said connection from said second computing unit to said online service, without using said connection from said second computing unit to said internal network, without said second computing unit accessing said shared resource, and without said second computing unit being connected to another computing unit, and wherein said second open status indicates an update to said source code to solve said second problem with said source code has not yet occurred;
means for automatically obtaining, by said first computing unit, a first location of said first portion within said text file;
means for automatically obtaining, by said second computing unit, a second location of said second portion within said text file;

means for automatically generating, by said first computing unit, a first review data packet (RDP) consisting of a first plurality of comment data units, a first plurality of effort data units, and a first separator field separating said first plurality of comment data units from said first plurality of effort data units, said first plurality of comment data units including a first comment data unit related to said first comment, said first comment data unit consisting of an author of said first comment, said first comment, a first line number of said text file, said first level of severity of said first problem with said source code, a first level of priority of said first problem, a date of a last update of said first RDP, said first open status indicating a status of actions to address said first problem, and a category of said first comment, said first line number being associated with said first comment and indicating said first location, said first RDP being a first computer file stored in said first computing unit separately from said text file, wherein said first plurality of effort data units includes a first effort data unit consisting of an identifier of said first user and an amount of time spent by said first user on a review of said text file;

means for automatically generating, by said second computing unit, a second RDP consisting of a second plurality of comment data units, a second plurality of effort data units, and a second separator field separating said second plurality of comment data units from said second plurality of effort data units, said second plurality of comment data units including a second comment data unit related to said second comment, said second comment data unit consisting of an author of said second comment, said second comment, a second line number of said text file, said second level of severity of said second problem with said source code, a second level of priority of said second problem, a date of a last update of said second RDP, said second open status indicating a status of actions to address said second problem, and a category of said second comment, said second line number being associated with said second comment and indicating said second location, said second RDP being a second computer file stored in said second computing unit separately from said text file, wherein said second plurality of effort data units includes a second effort data unit consisting of an identifier of said second user and an amount of time spent by said second user on a review of said text file;

means for distributing said first and second RDPs without said text file to a third computing unit utilized by a third user of said plurality of users, wherein said third user is authorized to rework said text file, and wherein said distributing said first and second RDPs to said third computing unit utilized by said third user is performed without requiring said third user to have access to a central data repository;

in a first section of a display, means for displaying a list of entries including first and second entries, said first entry including a first indicator of said first comment and said first level of severity of said first problem with said source code, and said second entry including a second indicator of said second comment and said second level of severity of said second problem with said source code;

based on said first indicator of said first comment and said first level of severity of said first problem with said source code included in said first entry in said displayed list in said first section of said display, means for receiving a first selection by said third user of said first indicator of said first comment from said first section of said display;

based on said received first selection of said first indicator of said first comment from said first section of said display, means for displaying, in a second section of said display different from said first section, said first comment together with said first portion of said text file, said first open status, said category of said first comment, and said first level of severity of said first problem with said source code by said third computing unit retrieving offline from said first RDP said first comment, said first open status, said first line number, said category of said first comment, and said first level of severity, wherein said third computing unit retrieving offline from said first RDP is performed without using a connection from said third computing unit to the Internet, without using a connection from said third computing unit to said online service, without using a connection from said third computing unit to said internal network, without said third computing unit accessing said shared resource, and without said third computing unit being connected to another computing unit;

based on said second indicator of said second comment and said second level of severity of said second problem with said source code included in said second entry in said displayed list in said first section of said display, means for receiving a second selection by said third user of said second indicator of said second comment from said first section of said display;

based on said received second selection of said second indicator of said second comment from said first section of said display, means for displaying, in said second section of said display, said second comment together with said second portion of said text file, said second open status, said category of said second comment, and said second level of severity of said second problem with said source code by said third computing unit retrieving offline from said second RDP said second comment, said second open, said second line number, said category of said second comment, and said second level of severity, wherein said third computing unit retrieving offline from said second RDP is performed without using said connection from said third computing unit to the Internet, without using said connection from said third computing unit to said online service, without using said connection from said third computing unit to said internal network, without said third computing unit accessing said shared resource, and without said third computing unit being connected to another computing unit;

based on said first portion of said text file, said first comment, said first open status, said category of said first comment, and said first level of severity of said first problem with said source code displayed in said second section of said display, means for receiving, by said third computing unit and from said third user, said update to said source code to solve said first problem with said source code; and means for receiving, by said third computing unit, a closed status to update said first open status, wherein said closed status indicates said update to said source code to solve said first problem with said source code has occurred.

9. The system of claim 8, wherein said means for receiving said first comment comprises means for receiving, by said first computing unit, a first input by said first user of a portion of said first comment, wherein said means for receiving said second comment comprises means for receiving, by said second computing unit, a second input by said second user of said second comment, and wherein said first input by said first user is during said second input by said second user.

10. The system of claim 8, wherein said means for distributing said first and second RDPs to said third computing unit utilized by said third user includes means for sharing said first and second RDPs with said third computing unit via an electronic mail system.

11. The system of claim 8, further comprising:
means for receiving, by said third computing unit, one or more comments input by said third user, wherein said one or more comments are associated with said first portion of said text file; and
means for storing, by said third computing unit, said one or more comments and said closed status input by said third user in a consolidated RDP that includes said first comment, said first line number, said second comment, and said second line number.

12. The system of claim 8, further comprising:
means for merging said first RDP and second RDP into a consolidated RDP including said author of said first comment, said first comment, said first line number of said text file, said first level of severity, said first level of priority of said first problem, said date of said last update of said first RDP, said first open status, said category of said first comment, said author of said second comment, said second comment, said second line number of said text file, said second level of severity, said second level of priority of said second problem, said date of said last update of said second RDP, said second open status, and said category of said second comment, said consolidated RDP being stored as a third computer file;
means for distributing said consolidated RDP to said third computing unit without said text file, wherein said distributing said consolidated RDP includes said distributing said first and second RDPs; and
based on said consolidated RDP including said first comment, said first line number, said first level of severity of said first problem with said source code, said first open status, said second comment, said second line number, said second level of severity of said second problem with said source code, and said second open status, means for receiving a rework of said text file by said third user, wherein said rework includes said update to said source code to solve said first problem and an update to said source code to solve said second problem with said source code.

13. The system of claim 8, wherein said means for receiving said first comment includes means for receiving a first input by said first user via a first user interface, wherein said means for receiving said update to said source code includes receiving a second input by said third user via a second user interface, and wherein said first and second user interfaces are identical.

14. The system of claim 8, further comprising means for maintaining contents and a format of said text file during said receiving said first comment, receiving said second comment, obtaining said first location, obtaining said second location, generating said first RDP, and generating said second RDP, wherein said maintaining preserves said text file as unmodified in said contents and said format, and preserves said text file as unconverted to another file of a second format different from said format of said text file.

15. At least one tangible program storage device readable by a machine, tangibly embodying at least one program of instructions executable by the machine to perform a method of reviewing a text file by a plurality of users, said plurality of users including a first user utilizing a first computing unit and a second user utilizing a second computing unit, said tangible program storage device not being a transitory signal transmission, said method comprising:

said first computing unit receiving offline, from said first user utilizing said first computing unit, a first comment associated with a first portion of said text file, wherein said first computing unit receiving offline said first comment includes said first computing unit receiving said first comment without using a connection from said first computing unit to the Internet, without using a connection from said first computing unit to an online service, without using a connection from said first computing unit to an internal network, without said first computing unit accessing a shared resource, and without said first computing unit being connected to another computing unit, wherein said text file includes a source code, and wherein said first comment indicates a first problem with said source code;

said first computing unit receiving a first selection offline of a first level of severity of said first problem with said source code;

said first computing unit receiving a first open status offline, wherein said first computing unit receiving said first open status offline includes said first computing unit receiving said first open status without using said connection from said first computing unit to the Internet, without using said connection from said first computing unit to said online service, without using said connection from said first computing unit to said internal network, without said first computing unit accessing said shared resource, and without said first computing unit being connected to another computing unit, and wherein said first open status indicates an update to said source code to solve said first problem with said source code has not yet occurred;

said second computing unit receiving offline, from said second user utilizing said second computing unit, a second comment associated with a second portion of said text file, wherein said second computing unit receiving offline said second comment includes said second computing unit receiving said second comment without using a connection from said second computing unit to the Internet, without using a connection from said second computing unit to said online service, without using a connection from said second computing unit to said internal network, without said second computing unit accessing said shared resource, and without said second computing unit being connected to another computing unit, and wherein said second comment indicates a second problem with said source code;

said second computing unit receiving a second selection offline of a second level of severity of said second problem with said source code;

said second computing unit receiving a second open status offline, wherein said second computing unit receiving said second open status offline includes said second computing unit receiving said second open status without using said connection from said second computing unit to the Internet, without using said connection from said second computing unit to said online service, without using said connection from said second computing unit to said internal network, without said second computing unit accessing said shared resource, and without said second computing unit being connected to another computing unit, and wherein said second open status indicates an update to said source code to solve said second problem with said source code has not yet occurred;

automatically obtaining, by said first computing unit, a first location of said first portion within said text file;

automatically obtaining, by said second computing unit, a second location of said second portion within said text file;

automatically generating, by said first computing unit, a first review data packet (RDP) consisting of a first plurality of comment data units, a first plurality of effort data units, and a first separator field separating said first plurality of comment data units from said first plurality of effort data units, said first plurality of comment data units including a first comment data unit related to said first comment, said first comment data unit consisting of an author of said first comment, said first comment, a first line number of said text file, said first level of severity of said first problem with said source code, a first level of priority of said first problem, a date of a last update of said first RDP, said first open status indicating a status of actions to address said first problem, and a category of said first comment, said first line number being associated with said first comment and indicating said first location, said first RDP being a first computer file stored in said first computing unit separately from said text file, wherein said first plurality of effort data units includes a first effort data unit consisting of an identifier of said first user and an amount of time spent by said first user on a review of said text file;

automatically generating, by said second computing unit, a second RDP consisting of a second plurality of comment data units, a second plurality of effort data units, and a second separator field separating said second plurality of comment data units from said second plurality of effort data units, said second plurality of comment data units including a second comment data unit related to said second comment, said second comment data unit consisting of an author of said second comment, said second comment, a second line number of said text file, said second level of severity of said second problem with said source code, a second level of priority of said second problem, a date of a last update of said second RDP, said second open status indicating a status of actions to address said second problem, and a category of said second comment, said second line number being associated with said second comment and indicating said second location, said second RDP being a second computer file stored in said second computing unit separately from said text file, wherein said second plurality of effort data units includes a second effort data unit consisting of an identifier of said second user and an amount of time spent by said second user on a review of said text file;

distributing said first and second RDPs without said text file to a third computing unit utilized by a third user of said plurality of users, wherein said third user is authorized to rework said text file, and wherein said distributing said first and second RDPs to said third computing unit utilized by said third user is performed without requiring said third user to have access to a central data repository;

in a first section of a display, said third computing unit displaying a list of entries including first and second entries, said first entry including a first indicator of said first comment and said first level of severity of said first problem with said source code, and said second entry including a second indicator of said second comment and said second level of severity of said second problem with said source code;

based on said first indicator of said first comment and said first level of severity of said first problem with said source code included in said first entry in said displayed list in said first section of said display, said third computing unit receiving a first selection by said third user of said first indicator of said first comment from said first section of said display;

based on said received first selection of said first indicator of said first comment from said first section of said display, said third computing unit displaying, in a second section of said display different from said first section, said first comment together with said first portion of said text file, said first open status, said category of said first comment, and said first level of severity of said first problem with said source code by said third computing unit retrieving offline from said first RDP said first comment, said first open status, said first line number, said category of said first comment, and said first level of severity, wherein said third computing unit retrieving offline from said first RDP is performed without using a connection from said third computing unit to the Internet, without using a connection from said third computing unit to said online service, without using a connection from said third computing unit to said internal network, without said third computing unit accessing said shared resource, and without said third computing unit being connected to another computing unit;

based on said second indicator of said second comment and said second level of severity of said second problem with said source code included in said second entry in said displayed list in said first section of said display, said third computing unit receiving a second selection by said third user of said second indicator of said second comment from said first section of said display;

based on said received second selection of said second indicator of said second comment from said first section of said display, said third computing unit displaying, in said second section of said display, said second comment together with said second portion of said text file, said second open status, said category of said second comment, and said second level of severity of said second problem with said source code by said third computing unit retrieving offline from said second RDP said second comment, said second open status, said second line number, said category of said second comment, and said second level of severity, wherein said third computing unit retrieving offline from said second RDP is performed without using said connection from said third computing unit to the Internet, without using said connection from said third computing unit to said online service, without using said connection from said third computing unit to said internal network, without said third computing unit accessing said shared resource, and without said third computing unit being connected to another computing unit;

based on said first portion of said text file, said first comment, said first open status, said category of said first comment, and said first level of severity of said first problem with said source code displayed in said second section of said display, said third computing unit receiving from said third user said update to said source code to solve said first problem with said source code; and said third computing unit receiving a closed status to update said first open status, wherein said closed status indicates said update to said source code to solve said first problem with said source code has occurred.

16. The at least one tangible program storage device of claim 15, wherein said receiving said first comment comprises said first computing unit receiving a first input by said first user of a portion of said first comment, wherein said receiving said second comment comprises said second computing unit receiving a second input by said second user of said second comment, and wherein said first input by said first user is during said second input by said second user.

17. The at least one tangible program storage device of claim 15, wherein said distributing said first and second RDPs to said third computing unit utilized by said third user includes sharing said first and second RDPs with said third computing unit via an electronic mail system.

18. The at least one tangible program storage device of claim 15, said method further comprising:
  said third computing unit receiving one or more comments input by said third user, wherein said one or more comments are associated with said first portion of said text file; and
  said third computing unit storing said one or more comments and said closed status input by said third user in a consolidated RDP that includes said first comment, said first line number, said second comment, and said second line number.

19. The at least one tangible program storage device of claim 15, wherein said method further comprises:
  merging said first RDP and second RDP into a consolidated RDP including said author of said first comment, said first comment, said first line number of said text file, said first level of severity, said first level of priority of said first problem, said date of said last update of said first RDP, said first open status, said category of said first comment, said author of said second comment, said second comment, said second line number of said text file, said second level of severity, said second level of priority of said second problem, said date of said last update of said second RDP, said second open status, and said category of said second comment, said consolidated RDP being stored as a third computer file;
  distributing said consolidated RDP to said third computing unit without said text file, wherein said distributing said consolidated RDP includes said distributing said first and second RDPs; and
  based on said consolidated RDP including said first comment, said first line number, said first level of severity of said first problem with said source code, said first open status, said second comment, said second line number, said second level of severity of said second problem with said source code, and said second open status, said third computing unit receiving a rework of said text file by said third user, wherein said rework includes said update to said source code to solve said first problem and an update to said source code to solve said second problem with said source code.

20. A method for deploying computing infrastructure, comprising integrating computer-readable code into a computing system, wherein the code in combination with the computing system is capable of performing a process of reviewing a text file by a plurality of users, said plurality of users including a first user utilizing a first computing unit and a second user utilizing a second computing unit, said process comprising:
  said first computing unit receiving offline, from said first user utilizing said first computing unit, a first comment associated with a first portion of said text file, wherein said first computing unit receiving offline said first comment includes said first computing unit receiving said first comment without using a connection from said first computing unit to the Internet, without using a connection from said first computing unit to an online service, without using a connection from said first computing unit to an internal network, without said first computing unit accessing a shared resource, and without said first computing unit being connected to another computing unit, wherein said text file includes a source code, and wherein said first comment indicates a first problem with said source code;
  said first computing unit receiving a first selection offline of a first level of severity of said first problem with said source code;
  said first computing unit receiving a first open status offline, wherein said first computing unit receiving said first open status offline includes said first computing unit receiving said first open status without using said connection from said first computing unit to the Internet, without using said connection from said first computing unit to said online service, without using said connection from said first computing unit to said internal network, without said first computing unit accessing said shared resource, and without said first computing unit being connected to another computing unit, and wherein said first open status indicates an update to said source code to solve said first problem with said source code has not yet occurred;
  said second computing unit receiving offline, from said second user utilizing said second computing unit, a second comment associated with a second portion of said text file, wherein said second computing unit receiving offline said second comment includes said second computing unit receiving said second comment without using a connection from said second computing unit to the Internet, without using a connection from said second computing unit to said online service, without using a connection from said second computing unit to said internal network, without said second computing unit accessing said shared resource, and without said second computing unit being connected to another computing unit, and wherein said second comment indicates a second problem with said source code;
  said second computing unit receiving a second selection offline of a second level of severity of said second problem with said source code;
  said second computing unit receiving a second open status offline, wherein said second computing unit receiving said second open status offline includes said second computing unit receiving said second open status without using said connection from said second computing unit to the Internet, without using said connection from said second computing unit to said online service, without using said connection from said second computing unit to said internal network, without said second computing unit accessing said shared resource, and without said second computing unit being connected to another computing unit, and wherein said second open status indicates an update to said source code to solve said second problem with said source code has not yet occurred;
  automatically obtaining, by said first computing unit, a first location of said first portion within said text file;
  automatically obtaining, by said second computing unit, a second location of said second portion within said text file;

automatically generating, by said first computing unit, a first review data packet (RDP) consisting of a first plurality of comment data units, a first plurality of effort data units, and a first separator field separating said first plurality of comment data units from said first plurality of effort data units, said first plurality of comment data units including a first comment data unit related to said first comment, said first comment data unit consisting of an author of said first comment, said first comment, a first line number of said text file, said first level of severity of said first problem with said source code, a first level of priority of said first problem, a date of a last update of said first RDP, said first open status indicating a status of actions to address said first problem, and a category of said first comment, said first line number being associated with said first comment and indicating said first location, said first RDP being a first computer file stored in said first computing unit separately from said text file, wherein said first plurality of effort data units includes a first effort data unit consisting of an identifier of said first user and an amount of time spent by said first user on a review of said text file;

automatically generating, by said second computing unit, a second RDP automatically generating, by a processor of said second computing unit, a second RDP consisting of a second plurality of comment data units, a second plurality of effort data units, and a second separator field separating said second plurality of comment data units from said second plurality of effort data units, said second plurality of comment data units including a second comment data unit related to said second comment, said second comment data unit consisting of an author of said second comment, said second comment, a second line number of said text file, said second level of severity of said second problem with said source code, a second level of priority of said second problem, a date of a last update of said second RDP, said second open status indicating a status of actions to address said second problem, and a category of said second comment, said second line number being associated with said second comment and indicating said second location, said second RDP being a second computer file stored in said second computing unit separately from said text file, wherein said second plurality of effort data units includes a second effort data unit consisting of an identifier of said second user and an amount of time spent by said second user on a review of said text file;

distributing said first and second RDPs without said text file to a third computing unit utilized by a third user of said plurality of users, wherein said third user is authorized to rework said text file, and wherein said distributing said first and second RDPs to said third computing unit utilized by said third user is performed without requiring said third user to have access to a central data repository;

in a first section of a display, said third computing unit displaying a list of entries including first and second entries, said first entry including a first indicator of said first comment and said first level of severity of said first problem with said source code, and said second entry including a second indicator of said second comment and said second level of severity of said second problem with said source code;

based on said first indicator of said first comment and said first level of severity of said first problem with said source code included in said first entry in said displayed list in said first section of said display, said third computing unit receiving a first selection by said third user of said first indicator of said first comment from said first section of said display;

based on said received first selection of said first indicator of said first comment from said first section of said display, said third computing unit displaying, in a second section of said display different from said first section, said first comment together with said first portion of said text file, said first open status, said category of said first comment, and said first level of severity of said first problem with said source code by said third computing unit retrieving offline from said first RDP said first comment, said first open status, said first line number said category of said first comment, and said first level of severity, wherein said third computing unit retrieving offline from said first RDP is performed without using a connection from said third computing unit to the Internet, without using a connection from said third computing unit to said online service, without using a connection from said third computing unit to said internal network, without said third computing unit accessing said shared resource, and without said third computing unit being connected to another computing unit;

based on said second indicator of said second comment and said second level of severity of said second problem with said source code included in said second entry in said displayed list in said first section of said display, said third computing unit receiving a second selection by said third user of said second indicator of said second comment from said first section of said display;

based on said received second selection of said second indicator of said second comment from said first section of said display, said third computing unit displaying in said second section of said display, said second comment together with said second portion of said text file, said second open status, said category of said second comment, and said second level of severity of said second problem with said source code by said third computing retrieving offline from said second RDP said second comment, said second open status, said second line number, said category of said second comment, wherein said third computing unit retrieving offline from said second RDP is performed without using said connection from said third computing unit to the Internet, without using said connection from said third computing unit to said online service, without using said connection from said third computing unit to said internal network, without said third computing unit accessing said shared resource, and without said third computing unit being connected to another computing unit;

based on said first portion of said text file, said first comment, said first open status, said category of said first comment, and said first level of severity of said first problem with said source code displayed in said second section of said display, said third computing unit receiving from said third user said update to said source code to solve said first problem with said source code; and said third computing unit receiving a closed status to update said first open status, wherein said closed status indicates said update to said source code to solve said first problem with said source code has occurred.

21. The method of claim 20, wherein said receiving said first comment comprises said first computing unit receiving a first input by said first user of a portion of said first comment, wherein said receiving said second comment comprises said second computing unit receiving a second input by said second user of said second comment, and wherein said first input by said first user is during said second input by said second user.

22. The method of claim 20, wherein said distributing said first and second RDPs to said third computing unit utilized by said third user includes sharing said first and second RDPs with said third computing unit via an electronic mail system.

23. The method of claim 20, said process further comprising:
- said third computing unit receiving one or more comments input by said third user, wherein said one or more comments are associated with said first portion of said text file; and
- said third computing unit storing said one or more comments and said closed status input by said third user in a consolidated RDP that includes said first comment, said first line number, said second comment, and said second line number.

\* \* \* \* \*